United States Patent
Dheap et al.

(10) Patent No.: US 9,258,231 B2
(45) Date of Patent: Feb. 9, 2016

(54) BANDWIDTH ALLOCATION MANAGEMENT

(75) Inventors: Vijay Dheap, Durham, NC (US);
Suyash S. Jape, Maharashtra (IN);
Abhinay R. Nagpal, Maharashtra (IN);
Sandeep R. Patil, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 12/877,584

(22) Filed: Sep. 8, 2010

(65) Prior Publication Data
US 2012/0059937 A1    Mar. 8, 2012

(51) Int. Cl.
*H04L 12/801*    (2013.01)

(52) U.S. Cl.
CPC .................... *H04L 47/10* (2013.01)

(58) Field of Classification Search
USPC .................................. 709/224–226
See application file for complete search history.

(56) References Cited

U.S. PATENT DOCUMENTS

| | | | | |
|---|---|---|---|---|
| 6,324,184 B1 * | 11/2001 | Hou | .................... | H04L 12/2801 370/468 |
| 6,865,185 B1 * | 3/2005 | Patel | .................... | H04L 47/12 370/310 |
| 7,069,014 B1 * | 6/2006 | Thenthiruperai | . | H04L 29/06027 370/352 |
| 7,499,453 B2 * | 3/2009 | Carlson | .................... | H04L 12/2602 370/395.2 |
| 7,499,719 B2 * | 3/2009 | Rengaraju | .................... | H04L 29/06027 370/260 |
| 7,532,642 B1 * | 5/2009 | Peacock | .................... | H04L 43/0864 370/252 |
| 7,603,473 B2 * | 10/2009 | Hester | .................... | H04L 12/66 370/401 |
| 7,636,768 B2 | 12/2009 | Yang et al. | | |
| 7,698,380 B1 | 4/2010 | Amidon et al. | | |
| 7,716,660 B2 * | 5/2010 | Mackay | .................... | G06F 8/68 717/169 |
| 7,856,497 B2 * | 12/2010 | McKinnon, III | .... | H04L 12/2801 709/224 |
| 8,014,273 B1 * | 9/2011 | Barrett | .................... | H04L 41/0896 370/210 |
| 8,046,411 B2 * | 10/2011 | Hayashi | .................... | G06F 17/30017 709/204 |
| 8,077,665 B2 * | 12/2011 | Murugesu | .................... | H04L 1/1887 370/329 |
| 8,107,480 B2 * | 1/2012 | Imbimbo | .................... | H04L 63/30 370/389 |
| 8,201,180 B2 * | 6/2012 | Briscoe | .................... | H04L 41/0806 709/226 |
| 2002/0075844 A1 * | 6/2002 | Hagen | .................... | H04L 63/0442 370/351 |
| 2002/0172222 A1 * | 11/2002 | Ullmann | .................... | H04L 41/0213 370/468 |

(Continued)

FOREIGN PATENT DOCUMENTS

WO    2009057153 A2    5/2009

OTHER PUBLICATIONS

Kreijns, K. et al.; "Group Awareness Widgets for Enhancing Social Interaction in Computer-Supported Collaborative Learning Evironments: Design and Implementation"; 32nd ASEE/IEEE Frontiers in Education Conference; p. 14-20; Nov. 6-9, 2002.

(Continued)

*Primary Examiner* — Backhean Tiv
(74) *Attorney, Agent, or Firm* — Cantor Colburn LLP

(57) ABSTRACT

Bandwidth allocation management includes determining current available bandwidth of a network within which a computer system is operating. The bandwidth allocation management also includes using the current available bandwidth and applied feature delivery settings to determine an adjustment in feature delivery to the computer system. At least a portion of the feature delivery settings is specified by an end user of the computer system.

21 Claims, 4 Drawing Sheets

(56) References Cited

U.S. PATENT DOCUMENTS

| | | | |
|---|---|---|---|
| 2002/0186826 A1* | 12/2002 | Hsu | H04M 3/42136 379/201.01 |
| 2003/0069972 A1* | 4/2003 | Yoshimura | H04L 12/4645 709/226 |
| 2005/0021621 A1* | 1/2005 | Welch | H04L 12/5695 709/204 |
| 2006/0120282 A1* | 6/2006 | Carlson | H04L 12/2602 370/229 |
| 2006/0258385 A1* | 11/2006 | Hovestadt | H04M 1/72577 455/520 |
| 2006/0268784 A1* | 11/2006 | Lee | H04W 36/0016 370/331 |
| 2006/0293073 A1* | 12/2006 | Rengaraju | H04L 29/06027 455/518 |
| 2007/0016688 A1* | 1/2007 | Hester | H04L 12/66 709/238 |
| 2007/0083395 A1* | 4/2007 | Fors | G06F 19/322 705/3 |
| 2007/0133603 A1* | 6/2007 | Weaver | H04L 43/0882 370/468 |
| 2007/0299789 A1* | 12/2007 | Young | G06Q 30/02 705/400 |
| 2008/0056135 A1* | 3/2008 | Lee | H04L 12/5695 370/236 |
| 2008/0097929 A1* | 4/2008 | Hodges | G06Q 20/102 705/80 |
| 2008/0201386 A1* | 8/2008 | Maharajh | G06F 17/30035 |
| 2008/0294780 A1* | 11/2008 | Lanahan | H04L 12/2463 709/226 |
| 2009/0122751 A1* | 5/2009 | Murugesu | H04L 1/1887 370/329 |
| 2009/0164902 A1* | 6/2009 | Cohen | G10H 1/0025 715/716 |
| 2009/0180430 A1* | 7/2009 | Fadell | H04L 12/5695 370/329 |
| 2009/0187955 A1* | 7/2009 | Sullivan | H04N 21/44209 725/106 |
| 2009/0237418 A1 | 9/2009 | Nave et al. | |
| 2009/0271778 A1 | 10/2009 | Mandyam et al. | |
| 2009/0282127 A1* | 11/2009 | Leblanc | H04L 12/5695 709/219 |
| 2009/0319910 A1 | 12/2009 | Escapa et al. | |
| 2010/0002723 A1* | 1/2010 | Kerr | G06Q 30/0283 370/468 |
| 2010/0023874 A1* | 1/2010 | Frohwein | G06F 3/048 715/747 |
| 2010/0042692 A1 | 2/2010 | Irwin et al. | |
| 2010/0097968 A1* | 4/2010 | Elias | H04L 12/5602 370/310.1 |
| 2010/0262953 A1* | 10/2010 | Barboni | G06F 8/61 717/120 |
| 2010/0280934 A1* | 11/2010 | Kerr | G06Q 30/0283 705/34 |
| 2010/0333028 A1* | 12/2010 | Welsh | H04L 67/322 715/833 |
| 2011/0066752 A1* | 3/2011 | Lippincott | H04L 43/0894 709/233 |
| 2011/0145428 A1* | 6/2011 | Wei | G06F 3/0481 709/231 |
| 2011/0237238 A1* | 9/2011 | Hassan | H04W 16/14 455/422.1 |
| 2011/0307933 A1* | 12/2011 | Gavita | H04N 21/25858 725/112 |
| 2012/0059937 A1* | 3/2012 | Dheap | H04L 47/10 709/226 |

OTHER PUBLICATIONS

Leung, P., et al.; "A CSCW Framework for the Flexible Coupling of Groupware Widgets"; downloaded from IEEE Xplore on Apr. 19, 2010; 13 pages.

* cited by examiner

BANDWIDTH ALLOCATION MANAGEMENT

BACKGROUND

The present invention relates to computer networking, and more specifically, to adaptive, configurable feature delivery in a computer network environment.

Social networking sites such as Facebook® and LinkedIn®, goal-oriented sites such as Match.com® and eDiets.com®, as well as internal business networks (e.g., Intranet portals), provide the ability for individuals to associate and/or collaborate with other individuals over a network. These, and other, networking sites typically involve a community of users who share some common purpose (e.g., business/professional, social, and/or goal-oriented).

As technology advances, e.g., with respect to rich multimedia applications, competition among available resources (e.g., bandwidth and memory) often results. Consequently, there is becoming a greater need to manage and (when possible) conserve these finite resources. As consumers demand more and more content, higher definition services, interactive services, and data services, existing network infrastructures have become concerned with the increasing burden of providing adequate bandwidth to meet these demands.

During an active Internet browsing session, packets associated with various content sources are transmitted/streamed to an end user device. These packets are assigned some priority value which, in turn, determines the amount of bandwidth to be allocated to these packets. Video/audio packets consume substantial amounts of bandwidth when a user requests a page/resource that has video effects embedded therein. In order to provide maximum performance, these types of packets are typically assigned a greater priority.

Oftentimes, a computer system runs multiple applications that share available system resources, such as memory and bandwidth. When a number of full-featured applications are simultaneously running, the overall system performance may be hampered as a result of the finite amount of available resources. In such cases, even basic operations make take more time than desired to complete, thereby wasting the system user's valuable time.

Many applications provide much of their functionality as small plug-ins, which get loaded at runtime or which may be activated only when some action is taken. Even if the plug-in is activated upon the occurrence of some action, a corresponding user interface and underlying framework supporting the plug-in still consumes a considerable amount of resources and which makes the application 'heavy.'

An always-on widget (e.g., instant messenger) is one example of wasted bandwidth. For example, an always-on chat widget with video chat feature receives content even if the user will be not be watching it. When the widget remains fully equipped with all features despite its lack of use, it unnecessarily consumes bandwidth. While some sites offer a light version for users with low bandwidth Internet access, this solution offers no user discretion over what features will go into the light version. In addition, this solution does not provide for the enablement or disablement of features based upon the current needs of the system user.

SUMMARY

According to one embodiment of the present invention, a method for bandwidth allocation management is provided. The method includes determining current available bandwidth of a network within which a computer system is operating. The method also includes using the current available bandwidth and applied feature delivery settings to determine an adjustment in feature delivery to the computer system. At least a portion of the feature delivery settings is specified by an end user of the computer system.

According to another embodiment of the present invention, a system for bandwidth allocation management is provided. The system includes a computer processor and a bandwidth allocation management application executing on the computer processor. The bandwidth allocation management application implements a method. The method includes determining current available bandwidth of a network within which a computer system is operating. The method also includes using the current available bandwidth and applied feature delivery settings to determine an adjustment in feature delivery to the computer system. At least a portion of the feature delivery settings is specified by an end user of the computer system.

According to a further embodiment of the present invention, a computer program product for bandwidth allocation management is provided. The computer program product includes a computer-readable storage medium having instructions embodied thereon. The instructions are executed by a computer processor for implementing a method. The method includes determining current available bandwidth of a network within which a computer system is operating. The method also includes using the current available bandwidth and applied feature delivery settings to determine an adjustment in feature delivery to the computer system. At least a portion of the feature delivery settings is specified by an end user of the computer system.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description, taken in conjunction with the accompanying drawings, in which:

DETAILED DESCRIPTION

Exemplary embodiments of the invention provide bandwidth allocation management. The bandwidth allocation management provides the ability to enhance an end user's network computing experience by managing feature delivery over bandwidth constrained networks. The bandwidth allocation management dynamically formulates priority control policies and alters priority assignments on a packet level or stream level based upon various criteria and conditions that affect bandwidth usage and system performance. In an exemplary embodiment, a feature or widget refers to a portable block of software code that is configured for use with one or more applications and provides some specified functionality to these applications. For example, a widget may be a communications tool (chat, instant messenger, etc.). The bandwidth allocation management considers historical interactions of a system user with other members of the user's social or business network, as well as device capabilities of the system user's social network and peer devices. The bandwidth allocation management not only allows system users to provide input as to feature delivery preferences, but also provides suggestions to configure such feature delivery based on configurations being used by members of the user's network. These and other features of the bandwidth allocation management are described further herein.

Figure 1:
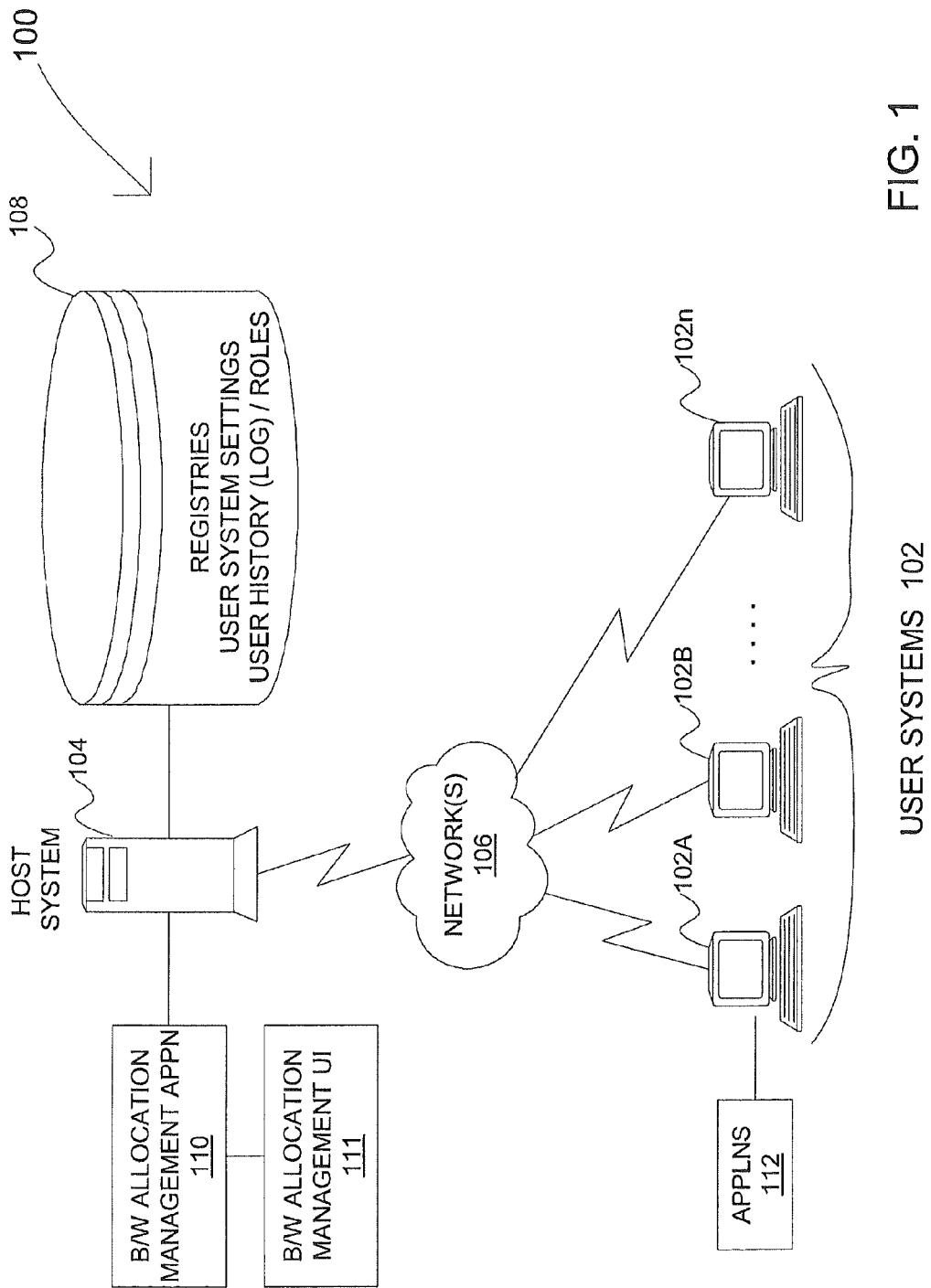
FIG. 1 depicts a block diagram of a system upon which bandwidth allocation management may be implemented in an exemplary embodiment.

With reference now to FIG. 1, an exemplary system upon which the bandwidth allocation management services may be implemented will now be described. The system of FIG. 1 includes a community of user systems 102 in communication with a host system 104 over one or more networks 106. The host system 104 executes computer instructions for performing the bandwidth allocation management services described herein. The host system 104 is also communicatively coupled to a storage device 108.

The user systems 102 each represent computer processing devices through which users at one or more geographic locations may contact the host system 104. As shown in FIG. 1, the user systems 102 may be coupled to the host system 104 via network(s) 106. Each user system 102 may be implemented using a general-purpose computer executing a computer program for carrying out the processes described herein. The user systems 102 may be personal computers (e.g., a lap top, a personal digital assistant) or host attached terminals. While shown in FIG. 1 as desktop devices, it will be understood that other types of end-user devices may be employed. For example, in one exemplary embodiment, one or more of the user systems 102 may be mobile devices, such as a cellular telephone. The processing described herein may be shared by a user system 102 and the host system 104 (e.g., by providing an applet to the user system 102).

The network(s) 106 may be any type of known networks including, but not limited to, a wide area network (WAN), a local area network (LAN), a global network (e.g. Internet), a virtual private network (VPN), and an intranet. The network 106 may be implemented using a wireless network (e.g., cellular, satellite, etc.) or any kind of physical network implementation known in the art. A user system 102 may be coupled to the host system through multiple networks (e.g., intranet and Internet) so that not all user systems 102 are coupled to the host system 104 through the same network. One or more of the user systems 102 and the host system 104 may be connected to the network 106 in a wireless fashion. In one embodiment, the network is an intranet and one or more user systems 102 execute a user interface application (e.g., a web browser) to contact the host system 104 through the network 106. In another exemplary embodiment, one or more of the user systems 102 is connected directly (i.e., not through the network 106) to the host system 104 and the host system 104 is connected directly to or contains the storage device 108.

The storage device 108 includes a data repository with data relating to facilitating the bandwidth allocation management services and may be implemented using a variety of devices for storing electronic information. It is understood that the storage device 108 may be implemented using memory contained in the host system 104 or that it may be a separate physical device (e.g., as shown in FIG. 1). The storage device 108 is logically addressable as a consolidated data source across a distributed environment that includes network(s) 106. Information stored in the storage device 108 may be retrieved and manipulated via the host system 104 and/or via the user systems 102.

The data repository includes one or more databases containing documents, files, and related data in support of the bandwidth allocation management services. In an exemplary embodiment, the storage device 108 stores registries, user system settings, and user history information. The system 100 stores registries, which in turn maintains corresponding version executables that may be used to determine adjustments to priorities of various features or widgets, as will be described further herein. The user history information may be obtained from various system logs, such as email, past usage of a widget or feature, roles and responsibilities of users within a team or group.

The host system 104 depicted in FIG. 1 may be implemented using one or more servers operating in response to a computer program stored in a storage medium accessible by the server. The host system 104 may operate as a network server (e.g., a web server) to communicate with the user systems 102. The host system 104 handles sending and receiving information to and from the user systems 102 and can perform associated tasks.

The host system 104 may also operate as an application server. The host system 104 executes one or more computer programs to provide the bandwidth allocation management services. As shown in FIG. 1, the host system 104 executes a bandwidth allocation management application 110 for implementing the bandwidth allocation management services described herein. Processing may be shared by the user systems 102 and the host system 104 by providing an application (e.g., java applet) to the user systems 102. Alternatively, the user systems 102 can include stand-alone software applications for performing a portion or all of the processing described herein. As previously described, it is understood that separate servers may be utilized to implement the network server functions and the application server functions. Alternatively, the network server and the application server may be implemented by a single server executing computer programs to perform the requisite functions. For purposes of illustration, the host system 104 is described herein as a business enterprise server that provides a business-oriented network portal (e.g., Intranet) for members of the business enterprise (e.g., user systems 102A-102n).

As shown in FIG. 1, the user systems 102 collectively form a community of users of the bandwidth allocation management services. As indicated above, for purposes of illustration, the user systems 102A-102n represent users who are members or employees of a business enterprise serviced via the host system 104. Each of the users of user systems 102A-102n may be assigned various roles and responsibilities with respect to the business goals adopted by the business enterprise of host system 104. As shown in FIG. 1, the user systems 102 may execute applications 112, such as for example, a web browser, a word processing application, communications applications (e.g., email, instant messaging, video conferencing, etc.), etc.

In one embodiment, the bandwidth allocation management application 110 provides a user interface 111 that enables users to provide input to the bandwidth allocation management services, as described further herein.

In one exemplary embodiment, the bandwidth allocation management application 110 provides the user interface 111 to enable each individual user of user systems 102A-102n to customize the feature delivery options provided by the bandwidth allocation management services. In an alternative embodiment, bandwidth allocation management application 110 may be implemented at a system administration level to provide the functionality of the bandwidth allocation management services without the individual input of user systems 102A-102n. For example, the bandwidth allocation management configurable options may be established at a system administrator level for the users of user systems 102A-102n. In yet a further embodiment, the bandwidth allocation management application 110 may be implemented as a default process in which the bandwidth allocation management application 110 dynamically evaluates system capabilities (e.g., system resource availability) and intelligently determines and adjusts feature delivery with no input from within the user community or may suggest such adjustments to the user community prior to implementation.

Figure 2:
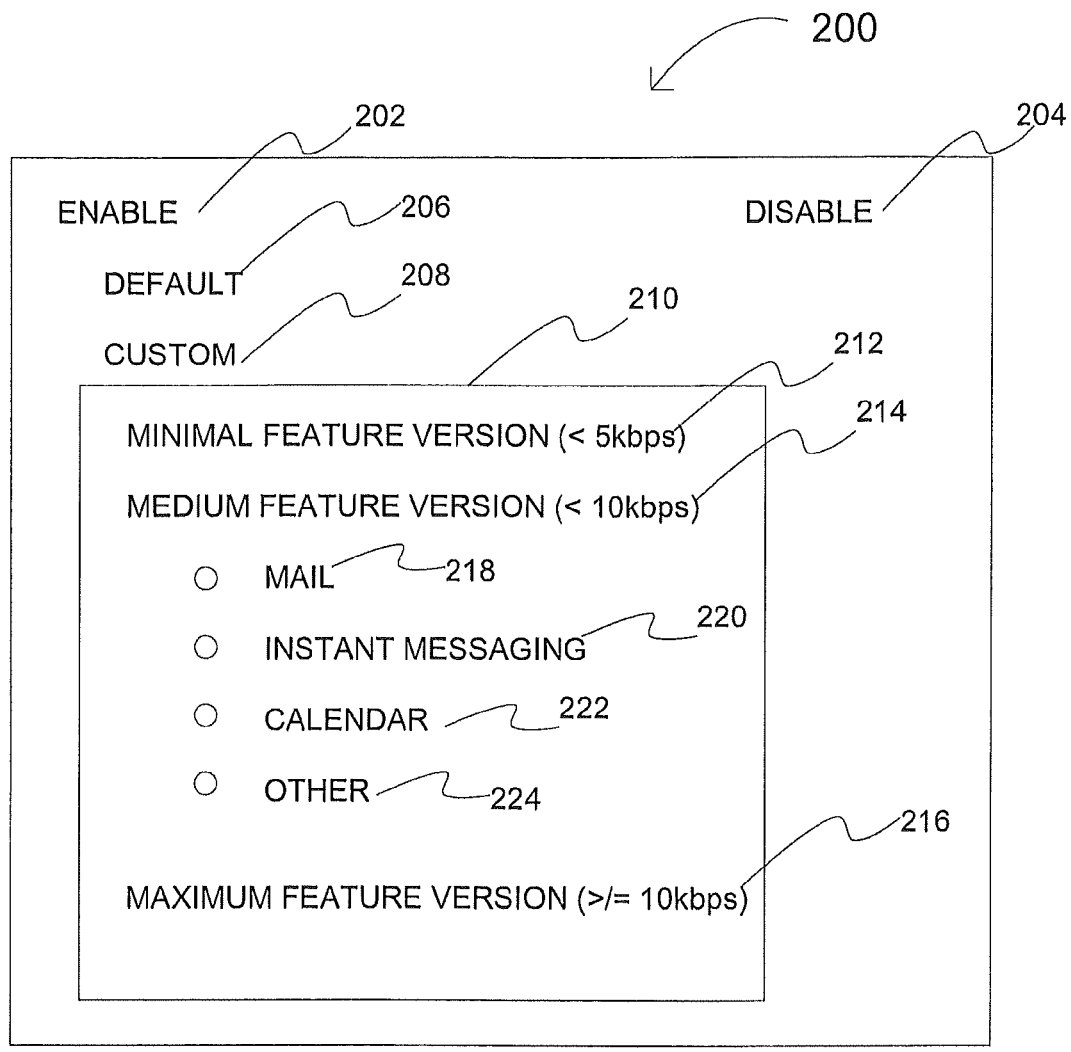
FIG. 2 depicts a user interface screen with configurable options provided by the bandwidth allocation management in an exemplary embodiment.
Figure 3:
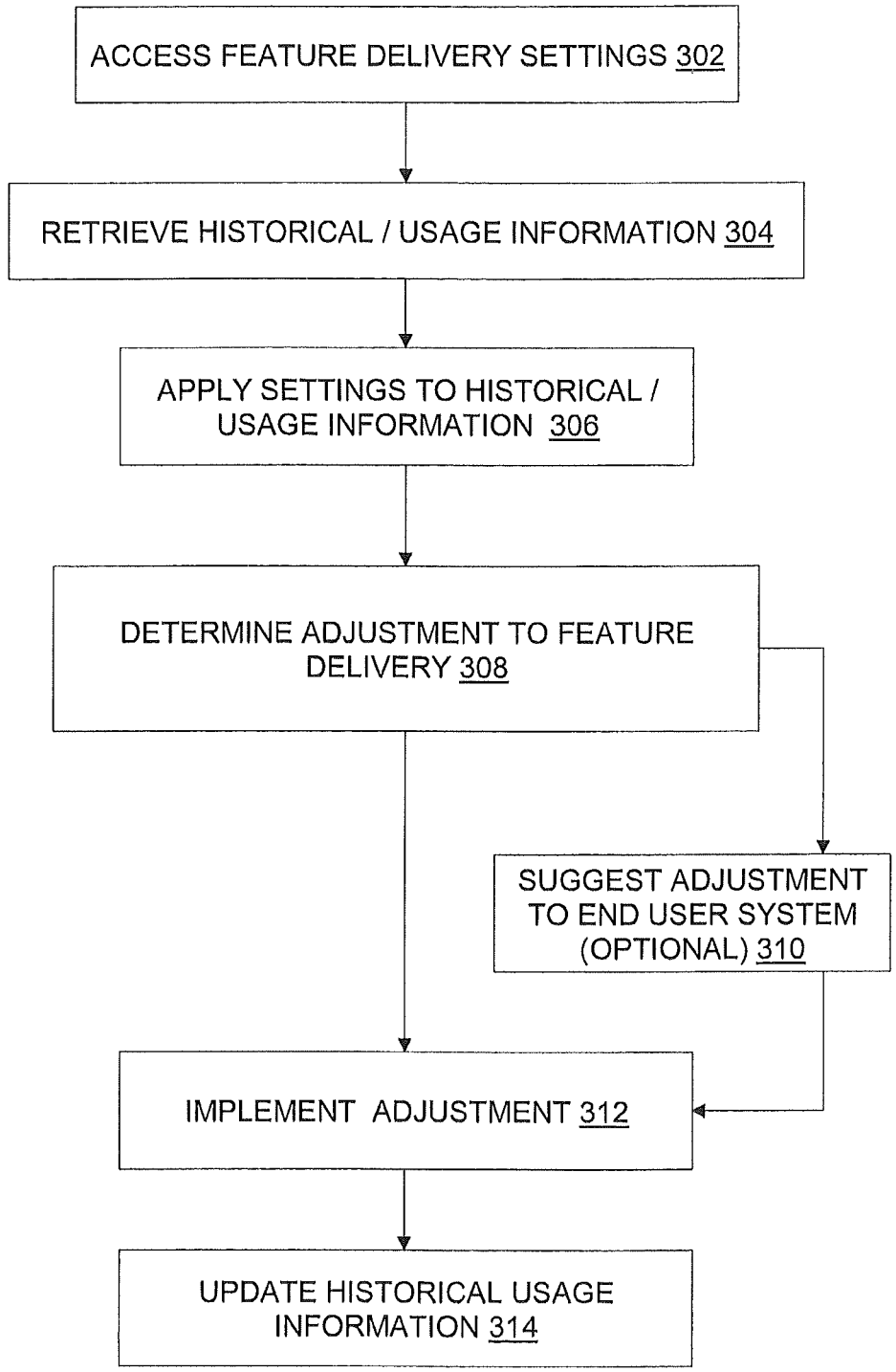
FIG. 3 illustrates a flow diagram describing a process for implementing the bandwidth allocation management in an exemplary embodiment.
Figure 4:
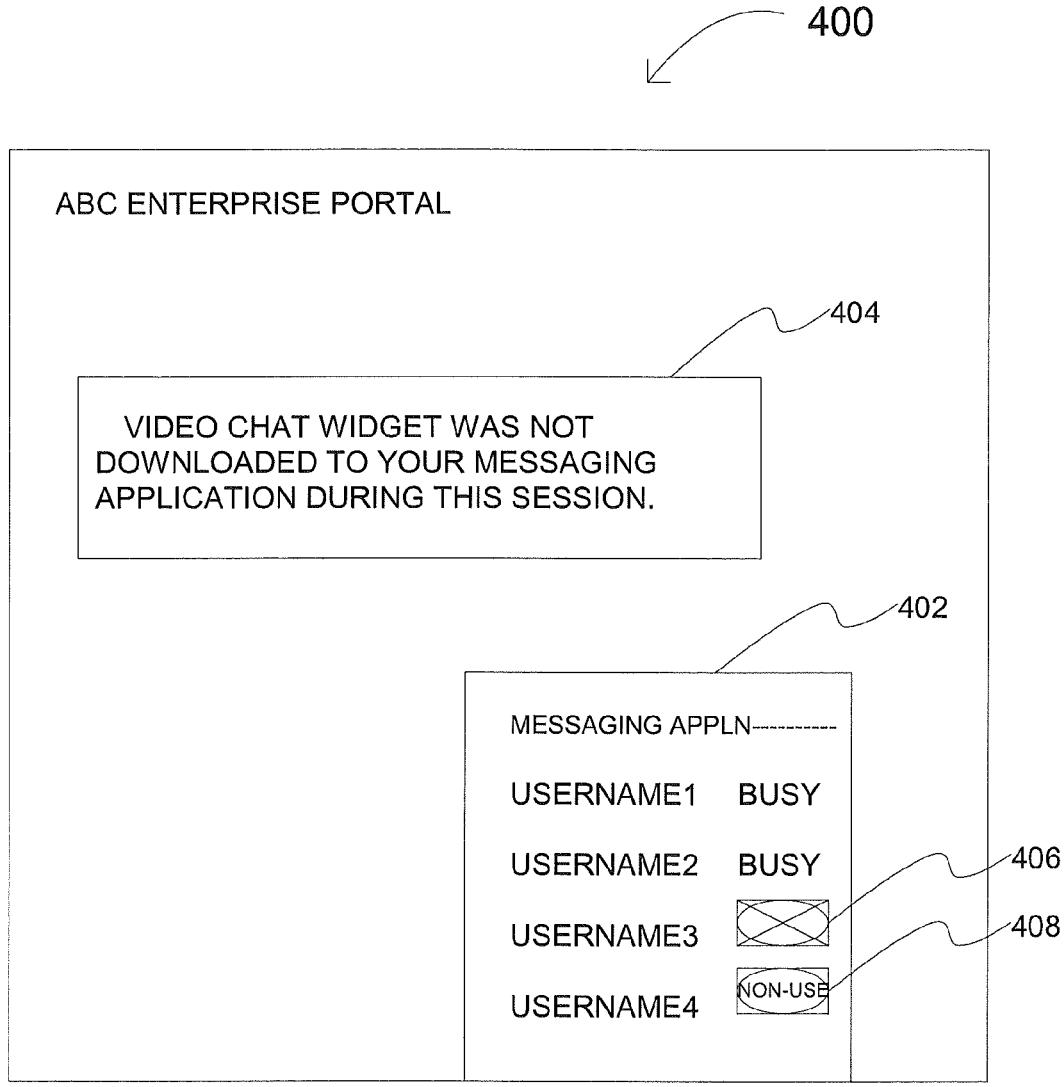
FIG. 4 depicts a user interface screen with sample data used in implementing the bandwidth allocation management in an exemplary embodiment.

Turning now to FIGS. 2-4, an exemplary user interface screen 200, flow diagram, and output user interface screen 400, respectively, will now be described in an exemplary embodiment. The processes described in FIG. 3 assume that a user system 102 has accessed the network 106 and has become online. The processes described in FIG. 3 further assume that the user system 102 has pre-defined custom configuration settings for the bandwidth allocation management services via the user interface screen 200. However, it will be understood that the exemplary bandwidth allocation management services are not so limited. For example, the bandwidth allocation management application 110 may provide the user interface screen 200 to the user system 102 during any point in the user system's online session. Alternatively, the bandwidth allocation management application 110 may provide the user system 102 with the ability to enable or disable the bandwidth allocation management services via the user interface screen 200 (e.g., enable option 202 and disable option 204). In a further embodiment, the user system 102 may be provided with the ability to select a default option 206 which causes the bandwidth allocation management application 110 to intelligently perform the bandwidth allocation management service functionality described herein without input by the user system 102. However, as indicated above, the processes described in FIG. 3 assume that the user system 102 has pre-configured at least a portion of the bandwidth allocation management services through selection of a custom option 208 in the user interface screen 200 of FIG. 2.

The processes described in FIG. 3 further assume that once the user system 102 has accessed the network and one or more applications, the bandwidth allocation management application 110 determines the current bandwidth properties (e.g., available bandwidth). If the bandwidth availability is determined to be sufficient to load all features or widgets of the portal or the Web application in the accepted response time, in one embodiment, the bandwidth allocation management application 110 determines the current network state of the user system (e.g., which applications currently being accessed) and permits each of these widgets or features to be loaded to the user system 102. However, if the bandwidth availability is determined to be constrained, in one exemplary embodiment, the bandwidth allocation management application 110 switches to an optimization mode and performs the functions described in steps 302-314 herein.

At step 302, the bandwidth allocation management application 110 accesses the feature delivery settings (e.g., user system settings stored in storage device 108) pre-configured by the user system 102. These pre-configured settings are shown in FIG. 2. For example, once the user system selects the custom option 208, a window 210 is presented for guiding the user system through bandwidth optimization mode selections. The particular options 212-224 shown in window 210 are provided for illustrative purposes and are not intended to be limiting in scope. As shown in window 210, a user system 102 may select a minimal feature version 212, which causes the bandwidth allocation management application 110 to limit or adjust delivery (loading) of features or widgets for one or more applications running on the user system 102. For example, if the user system 102 selects the minimal feature version 212 for a given application, the bandwidth allocation management application 110 will disable a built-in chat feature of the application when it determines that the current bandwidth properties reflect that the user system 102 is operating at less than 5 kilobytes per second (kbps). In one embodiment, this may be implemented by downloading a light version of the application (i.e., one of applications 112 of FIG. 1).

Also as shown in the window 210 of FIG. 2, the user system 102 may otherwise select a medium feature version 214 or a maximum feature version 216. The medium feature version is effectuated when the user system 102 is operating at greater than or equal to 5 kbps but less than 10 kbps. Likewise, the maximum feature version 216 is effectuated when the user system 102 is operating at greater than or equal to 10 kbps. In addition, the bandwidth allocation management application user interface 111 further provides the user system 102 with the ability to more finely tune the configurable options 212, 214, and 216 by selecting among various features provided by the applications for which adjustments may be implemented in terms of reducing or conserving bandwidth. As shown, e.g., in window 210, the user system 102 may select from features, such as mail 218, instant messaging 220, calendar 222, and other 224. These features 218-224 are shown in FIG. 2 for illustrative purposes and are not to be construed as limiting in scope. It will be understood that any features of an application (widgets, plug-ins, etc.) may be configured for adjustment via the bandwidth allocation management services described herein in order to realize the advantages of the exemplary embodiments.

As indicated above, in one alternative embodiment of the invention, the bandwidth allocation management application 110 may be configured to present the user interface screen 200 to the user system 102 at any time during execution of an application on the network 106. In this embodiment, the user system 102 may be provided with the ability to dynamically select from options 212-224 (or modify pre-configured options 212-224) as the bandwidth availability of the network system 100 or individual user systems 102 change over time.

In an exemplary embodiment, the bandwidth allocation management application 110 may further consider past behavior (e.g., patterns of feature usage/non-usage) of the user system 102 and or user system peers (e.g., user systems 102B-102n when the user is operating user system 102A), as well as the current state of the user systems 102 in determining when or whether to adjust delivery of features or widgets in order to manage or conserve existing bandwidth at step 306. As indicated above, the host system 104 of FIG. 1 stores user history information (e.g., log files) of activities conducted over time by the user systems 102. For example, suppose that user system 102A primarily communicates with two user systems 102B and 102n and has never used a video chat feature with user system 102n but often uses the video chat feature with user system 102B. In assessing the current state of the network 106, as described above, the bandwidth allocation management application 110 determines that user system 102n is currently online and user system 102B is currently offline. The bandwidth allocation management application 110 may use this current state of the network 106 (i.e., user system 102B offline and user system 102n online), in conjunction with the user system's 102A past history (i.e., lack of video chat communications with user system 102n) to disable the video chat feature of the messaging application during the user system's 102A active session. However, the bandwidth allocation management application 110 may be configured to monitor the current state of the network 106 and, should the user system 102B become online, the bandwidth allocation management application 110 may determine an adjustment to load the video chat feature for the messaging application with respect to the user system 102A. The online status of user systems may be determined, e.g., via interrupts generated either manually or automatically by the system policy settings. In a further example, suppose the user system 102 has 100 friends (peer computer systems 102) out of which 20 are visible on the user system's messenger application. Assume, e.g., that out of these 20 users, 10 are in a "busy" state or "do not disturb" mode, and the remaining 10 peer computers are not equipped with a web cam or do not have bandwidth at their end of the network to provision a video chat. The application 110 may be configured to identify this network state and capabilities, and prevent a video chat widget from loading onto the user system 102.

Based upon the above configurations, network states, and historical information, the bandwidth allocation management application 110 determines adjustments to feature delivery at step 308. As indicated above, the adjustment may be to download a light version of a feature of an application (e.g., disable a feature). In one exemplary embodiment, the bandwidth allocation management application 110 may be configured to automatically implement the adjustment at step 312 or may be configured to provide a suggestion to the user system 102 to implement the adjustment at step 310. As shown, e.g., in FIG. 4, the user interface 400 includes a notification in a window 404 that a video chat feature has not been downloaded with a messaging application due to the current statuses of online users. For example, as shown in window 402, four users are currently online Username1 and Username2 are shown to be in a busy state (i.e., "busy") representing the users' current unavailability to chat, Username3 is shown (e.g., via status icon 406) as lacking video chat capability, and Username4 is shown (e.g., via status icon 408) as having video chat capability that is rarely, if ever, used. The notification in window 404 informs the user that the video chat widget was not downloaded to the messaging application. In one alternative embodiment, this notification window 404 may not be presented to the user; rather, the video chat widget is prevented from being downloaded without any further notice to the user in the event of a bandwidth constraint or in view of a desire to conserve unneeded bandwidth. By way of non-limiting example, the determination of whether an online user has such capabilities may be implemented, e.g., by identifying the presence or absence of peripheral components of the online users that are needed to perform the features defined by the widget (e.g., the absence of speakers indicates an inability of a user to conduct a voice chat).

In yet further embodiments of the present invention, the bandwidth allocation management application 110 may be configured to consider other criteria in determining whether or when to perform an adjustment to a feature delivery of an application. For example, suppose that a user system's 102A calendar application (e.g., one of applications 112) indicates a scheduled meeting with another user system 102B on a specified date and time. Suppose the user system 102A accesses the network 106 on that date and shortly before the scheduled meeting time. The bandwidth allocation management application 110 may be configured to retrieve the user system's 102A calendar, as well as the historical information (e.g., recall in the above example that the user system 102A frequently communicates via online chat feature with user system 102B) in evaluating whether to disable the video chat feature of the messaging application. Thus, in this embodiment, even if the bandwidth properties of the network 106 reveal that the network bandwidth capabilities are constrained, the bandwidth allocation management application 110 may permit the download of the video chat feature in order to accommodate an anticipated need by the user system 102A during the current online session. Other examples of this functionality include, e.g., a tasked item that requires sharing of a document or file—a file sharing widget is loaded when the activity time approaches. Another example is where a user is scheduled to attend a video web conference at 11:00 a.m.; the bandwidth allocation management application 110 dynamically fetches audio and video sharing widgets as the scheduled time approaches. The information used in the criteria described above may be gleaned, e.g., via a text search on the calendar entries or other system files using keywords and then determining which widget features a system user may require.

In yet a further embodiment, the bandwidth allocation management application 110 may be configured to examine the capabilities of peer user systems of a particular user system in determining what features to adjust (e.g., disable/enable) during an online session for the particular user system. For example, as indicated above, if the user system (e.g., system 102A) uses a particular feature on a frequent basis, however there is currently no other user system online that is configured with the capabilities required for that particular feature, the bandwidth allocation management application 110 may use this current state of the network 106 to adjust (e.g., disable) the particular feature, as its functionality would consume unnecessary resources without any added benefit to the user system 102A.

As indicated above, the feature delivery determination and execution may be implemented by prioritizing packets corresponding to the particular feature subject to adjustment. The bandwidth allocation management application 110 may utilize tuples to decide the loading priority. For example, each feature or widget may be assigned an index on the portal of the network 106 and a decision support system of the bandwidth allocation management application 110 includes a set of conditions defined for each widget.

For example:

$$FS: x \| y \| z$$

The server system (e.g., host system 104) queries the user system plug in to detect status of x, y, z conditions when the response is received, the decision for each widget is calculated based on a formula defined for the widget (e.g., FS will be loaded when either of x, y, z is true).

In the event that the widget the user requires is not loaded by the bandwidth allocation management application 110, the user may simply type the keyword for the widget e.g., "meeting," "calendar," etc. in a search box (not shown) and the widget is fetched. Also, the bandwidth allocation management application 110 may be updated for the system based on subsequent user behavior (as described in step 314). This intelligent adaptable and collaborative widget/feature delivery system thus optimizes bandwidth usage and delivers best response time when most required in low strength networks.

The adjustments to priority levels of features in widgets may be handled via, e.g., available application programming interface functions. Similar such mechanisms can be employed for use with the system which maintains different version executables and their information in its registry. Whenever a new application is to be started, the system determines which executable of the application is to be loaded.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product 500 embodied in one or more computer readable medium(s) 502 having computer readable program code embodied thereon 504.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for implementing bandwidth allocation management, the method comprising:
   determining current available bandwidth of a network within which a computer system is operating;
   determining capabilities of a peer computer system with respect to a feature, the peer computer system communicatively coupled to the computer system; and
   determining an adjustment in the feature, which is implemented by the computer system, using the current available bandwidth, the capabilities of the peer computer system, and an applied feature setting, the feature comprising one of a plurality of features implemented by an application residing on the computer system, at least a portion of the feature settings specified by an end user of the computer system, the feature comprising a block of software code configured for use with a plurality of applications including the application residing on the computer system, the software code providing a defined functionality to the plurality of applications;
   wherein the adjustment in the feature of the computer system includes one of enabling and disabling the feature to derive a network bandwidth commensurate with the feature settings specified by the end user.

2. The method of claim 1, further comprising:
   implementing the adjustment when a bandwidth threshold value identified from the current available bandwidth has been exceeded as defined by the feature settings.

3. The method of claim 1, further comprising:
   applying the feature settings to historical usage information, the historical usage information including patterns of feature usage and non-usage of the computer system; and
   upon determining, from the historical usage information and a current state of the computer system, that the feature is unused for a threshold period of time, disabling the feature.

4. The method of claim 3, wherein the historical user information includes patterns of feature usage and non-usage as between the computer system and a peer computer system;
   wherein the adjustment in the feature includes disabling the feature upon determining from the patterns of feature usage that the feature is unused between the computer system and the peer computer system.

5. The method of claim 1, further comprising:
   implementing the adjustment in response to determining a bandwidth threshold value identified from the current available bandwidth has been exceeded and in response to an acceptance of the adjustment by the end user of the computer system upon receiving a suggestion to implement the adjustment.

6. The method of claim 1, further comprising:
   searching system records for the computer system; and
   identifying elements in the system records that specify an anticipated need by the computer system to employ a feature of an application at a specified time;
   wherein determining an adjustment to the feature includes permitting download of the feature for use by the computer system at the specified time.

7. The method of claim 1, further comprising:
   using a social network status and feature capabilities to determine the adjustment in the feature of the computer system, comprising:
   determining availability of a peer computer system on the social network; and
   disabling a communication feature on the computer system when it is determined that the peer computer system is unavailable for communication.

8. The method of claim 1, wherein the feature includes a widget.

9. The method of claim 1, wherein the feature includes a plug-in.

10. A system for implementing bandwidth allocation management, the system comprising:
    a computer processor; and
    a bandwidth allocation management application executable by the computer processor, the bandwidth allocation management application configured to implement a method, the method comprising:
    determining current available bandwidth of a network within which a computer system is operating;
    determining capabilities of a peer computer system with respect to a feature, the peer computer system communicatively coupled to the computer system; and
    determining an adjustment in the feature, which is implemented by the computer system, using the current available bandwidth, the capabilities of the peer computer system, and applied feature settings, the feature comprising one of a plurality of features implemented by an application residing on the computer system, at least a portion of the feature settings specified by an end user of the computer system, the feature comprising a block of software code configured for use with a plurality of applications including the application residing on the computer system, the software code providing a defined functionality to the plurality of applications;
    wherein the adjustment in the feature of the computer system includes one of enabling and disabling the feature to derive a network bandwidth commensurate with the feature settings specified by the end user.

11. The system of claim 10, wherein the method further comprises:
    implementing the adjustment when a bandwidth threshold value identified from the current available bandwidth has been exceeded as defined by the feature settings.

12. The system of claim 10, wherein the method further comprises:
    applying the feature settings to historical usage information, the historical usage information including patterns of feature usage and non-usage of the computer system; and
    upon determining, from the historical usage information and a current state of the computer system, that the feature is unused for a threshold period of time, disabling the feature.

13. The system of claim 12, wherein the historical user information includes patterns of feature usage and non-usage as between the computer system and a peer computer system; wherein the adjustment in the feature includes disabling the feature upon determining from the patterns of feature usage that the feature is unused between the computer system and the peer computer system.

14. The system of claim 10, wherein the method further comprises:
implementing the adjustment in response to determining a bandwidth threshold value identified from the current available bandwidth has been exceeded and in response to an acceptance of the adjustment by the end user of the computer system upon receiving a suggestion to implement the adjustment.

15. The system of claim 10, wherein the method further comprises:
searching system records for the computer system; and
identifying elements in the system records that specify an anticipated need by the computer system to employ a feature of an application at a specified time;
wherein determining an adjustment to the the feature includes permitting download of the feature for use by the computer system at the specified time.

16. A computer program product for implementing bandwidth allocation management, the computer program product including a non-transitory computer-readable storage medium having instructions embodied thereon, which when executed by a computer processor cause the computer processor to implement a method, the method comprising:
determining current available bandwidth of a network within which a computer system is operating;
determining capabilities of a peer computer system with respect to a feature, the peer computer system communicatively coupled to the computer system; and
determining an adjustment in the feature, which is implemented by the computer system, using the current available bandwidth, the capabilities of the peer computer system, and applied feature settings, the feature comprising one of a plurality of features implemented by an application residing on the computer system, at least a portion of the feature settings specified by an end user of the computer system, the feature comprising a block of software code configured for use with a plurality of applications including the application residing on the computer system, the software code providing a defined functionality to the plurality of applications;
wherein the adjustment in the feature of the computer system includes one of enabling and disabling the feature to derive a network bandwidth commensurate with the feature settings specified by the end user.

17. The computer program product of claim 16, wherein the method further comprises:
implementing the adjustment when a bandwidth threshold value identified from the current available bandwidth has been exceeded as defined by the feature settings.

18. The computer program product of claim 16, wherein the method further comprises:
applying the feature settings to historical usage information, the historical usage information including patterns of feature usage and non-usage of the computer system; and
upon determining, from the historical usage information and a current state of the computer system, that the feature is unused for a threshold period of time, disabling the feature.

19. The computer program product of claim 16, wherein the historical user information includes patterns of feature usage and non-usage as between the computer system and a peer computer system;
wherein the adjustment in the feature includes disabling the feature upon determining from the patterns of feature usage that the feature is unused between the computer system and the peer computer system.

20. The computer program product of claim 16, wherein the method further comprises:
implementing the adjustment in response to determining a bandwidth threshold value identified from the current available bandwidth has been exceeded and in response to an acceptance of the adjustment by the end user of the computer system upon receiving a suggestion to implement the adjustment.

21. The computer program product of claim 16, wherein the method further comprises:
searching system records for the computer system; and
identifying elements in the system records that specify an anticipated need by the computer system to employ a feature of an application at a specified time;
wherein determining an adjustment to the feature includes permitting download of the feature for use by the computer system at the specified time.

* * * * *